(12) United States Patent
Chun et al.

(10) Patent No.: US 9,167,465 B2
(45) Date of Patent: Oct. 20, 2015

(54) METHOD FOR TRANSCEIVING CHANNEL STATE INFORMATION AND TRANSCEIVING DEVICE

(75) Inventors: Jinyoung Chun, Anyang-si (KR); Kitae Kim, Anyang-si (KR); Sunam Kim, Anyang-si (KR); Jiwon Kang, Anyang-si (KR); Binchul Ihm, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 14/004,965

(22) PCT Filed: Jan. 20, 2012

(86) PCT No.: PCT/KR2012/000520
§ 371 (c)(1),
(2), (4) Date: Sep. 13, 2013

(87) PCT Pub. No.: WO2012/124892
PCT Pub. Date: Sep. 20, 2012

(65) Prior Publication Data
US 2013/0343220 A1     Dec. 26, 2013

Related U.S. Application Data

(60) Provisional application No. 61/453,133, filed on Mar. 16, 2011, provisional application No. 61/452,173, filed on Mar. 14, 2011.

(51) Int. Cl.
H04W 24/10 (2009.01)
H04B 7/02 (2006.01)
H04B 7/06 (2006.01)

(52) U.S. Cl.
CPC ............... *H04W 24/10* (2013.01); *H04B 7/024* (2013.01); *H04B 7/063* (2013.01); *H04B 7/0626* (2013.01); *H04B 7/0632* (2013.01); *H04B 7/0639* (2013.01)

(58) Field of Classification Search
CPC ......... H04J 3/00; H04W 24/00; H04W 24/02; H04W 72/0413; H04W 72/042; H04W 4/26; H04W 24/10; H04W 36/30; H04W 40/125; H04W 72/085
See application file for complete search history.

(56) References Cited

U.S. PATENT DOCUMENTS

2006/0116080 A1* 6/2006 Eom .............................. 455/62
2009/0291702 A1* 11/2009 Imai et al. .................... 455/517

FOREIGN PATENT DOCUMENTS

WO     WO 2010/085092 A2     7/2010

OTHER PUBLICATIONS

Fujitsu, "Review of proposals for UE feedback supporting CoMP," 3GPP TSG-RAN1#63bis, R1-110466, Dublin, Ireland, Jan. 17-21, 2011, pp. 1-3.

(Continued)

*Primary Examiner* — Anez Ebrahim
(74) *Attorney, Agent, or Firm* — Birch, Stewart, Kolasch & Birch, LLP (57) ABSTRACT

The present invention relates to a method, in which a terminal transmits channel state information in a multi-node system, which includes the steps of: receiving information about cooperative transmission candidate nodes from a network; calculating first channel state information about the cooperative transmission candidate nodes; calculating second channel state information by assuming that the nodes included in the interference candidate modes are interference nodes among the cooperative transmission candidate nodes; and transmitting the calculated first and second channel state information to the network.

8 Claims, 5 Drawing Sheets

(56) References Cited

OTHER PUBLICATIONS

Marvell, "Performance Evaluation of Intrasite Coordinated Beamforming," 3GPP TSG-RAN WG1#63bis, R1-110269, Dublin, Ireland, Jan. 17-21, 2011, pp. 1-4.

Texas Instruments, "Study on Coordinated Multi-Point Operation for LTE," 3GPP TSGRAN WG1 #63bis, R1-110264, Dublin, Ireland, Jan. 17-21, 2011, pp. 1-2.

LG Electronics, "CoMP Configurations and UE/eNB Behaviors in LTE-advanced", 3 GPP TSG RAN WG1 Meeting #55bis, Agenda 12.3, Ljubljana, Slovenia, Jan. 12-17, 2009, 4 pages, R1-090213.

LG Electronics, "CQI contents & measurement for SU-MIMO/MU-MIMO/CoMP", 3 GPP TSG RAN WG1 Meeting #59b, Agenda Item: 7.2.5, Valencia, Spain, Jan. 18-22, 2010, 5 pages, R1-100220.

* cited by examiner

METHOD FOR TRANSCEIVING CHANNEL STATE INFORMATION AND TRANSCEIVING DEVICE

CROSS-REFERENCE TO RELATED APPLICATIONS

This application is the National Phase of PCT/KR2012/000520 filed on Jan. 20, 2012, which claims priority under 35 U.S.C. 119(e) to U.S. Provisional Application Nos. 61/453,133 filed on Mar. 16, 2011 and 61/452,173 filed on Mar. 14, 2011, all of which are hereby expressly incorporated by reference into the present application.

TECHNICAL FIELD

The present invention relates to wireless communication, and more particularly, to a method and apparatus for transmitting and receiving channel state information in a multi-node system (DAS).

BACKGROUND ART

In a current wireless communication environment, data request for a network within a wireless communication system has been rapidly increased in accordance with the advent and spread of various devices such as a machine to machine (M2M) device to which M2M communication is applied, a smart phone, which requires high data transmission rate, and a tablet computer. In order to satisfy such increased data request, the communication technology has been developed towards the carrier aggregation technology and the cognitive radio technology, which are intended to use more frequency bands efficiently, and the multi-antenna technology and the multi-base station cooperative technology, which are intended to increase data capacity within a limited frequency. Also, a wireless communication environment has evolved towards a direction that density of nodes that may be accessed by a user is increased. The system having nodes of high density may have higher system throughput through cooperation between the nodes. This system performs cooperative communication by using a plurality of nodes, each of which acts as a base station (for example, advanced BS, Node-B, eNode-B), an access point (AP), an antenna, an antenna group, a radio remote header (RRH), and a radio remote unit (RRU).

Moreover, if all the nodes are transmitted and received under the control of one controller and thus each of the nodes is operated as an antenna group of one base station, this system may be regarded as a single distributed antenna system (DAS). At this time, each node may be given a separate node ID, or may be operated as some antenna within a cell without separate node ID.

In the meantime, if each node performs scheduling and handover with its respective cell ID in the DAS, the system may be regarded as a multi-cell (for example, macro cell/femto cell/pico cell) system. If multiple cells configured by the respective nodes are overlaid in accordance with coverage, it refers to a multi-tier network.

Various types of base stations may be used as nodes regardless of their titles. In other words, a base station (BS), a Node-B (NB), eNode-B (eNB), a pico cell eNB (PeNB), a home eNB (HeNB), RRH, RRU, a relay, and a repeater may be the nodes. At least one antenna is installed in one node. The antenna may mean a physical antenna, or may mean an antenna port, a virtual antenna, or an antenna group. Also, the node may be referred to as a point.

Although the nodes refer to antenna groups spaced apart from one another at certain intervals, they may mean random antenna groups regardless of the spacing. For example, it may be defined that the base station controls a node of H-pol antenna and a node of V-pol antenna.

DISCLOSURE

Technical Problem

An object of the present invention devised to solve the conventional problem is to provide a method for transmitting and receiving channel state information efficiently for cooperative transmission or cooperative interference removal between nodes in a multi-node system (DAS), and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, in one aspect of the present invention, a method for transmitting channel state information from a user equipment in a multi-node system comprises receiving information on cooperative transmission candidate nodes and interference candidate nodes from a network; calculating first channel state information on the cooperative transmission candidate nodes; calculating second channel state information by assuming that the nodes included in the interference candidate modes among the cooperative transmission candidate nodes are interference nodes; and transmitting the calculated first channel state information and the calculated second channel state information to the network.

To solve the aforementioned technical problems, in another aspect of the present invention, a method for receiving channel state information at a network in a multi-node system comprises transmitting information on cooperative transmission candidate nodes and interference candidate nodes to a user equipment; receiving first channel state information calculated on the cooperative transmission candidate nodes from the user equipment; and receiving second channel state information from the user equipment, the second channel state information is calculated by assuming that the nodes included in the interference candidate modes among the cooperative transmission candidate nodes are interference nodes.

To solve the aforementioned technical problems, in still another aspect of the present invention, an apparatus for transmitting channel state information in a multi-node system comprises a transmitter; a receiver; and a processor, wherein the processor controls the receiver to receive information on cooperative transmission candidate nodes and interference candidate nodes from a network, calculates first channel state information on the cooperative transmission candidate nodes, calculates second channel state information by assuming that the nodes included in the interference candidate modes among the cooperative transmission candidate nodes are interference nodes, and controls the transmitter to transmit the calculated first channel state information and the calculated second channel state information to the network.

To solve the aforementioned technical problems, in further still another aspect of the present invention, an apparatus for receiving channel state information in a multi-node system comprises a transmitter; a receiver; and a processor, wherein the processor controls the transmitter to transmit information on cooperative transmission candidate nodes and interference candidate nodes to a user equipment, and controls the receiver to receive first channel state information calculated on the cooperative transmission candidate nodes from the user equipment and receive second channel state information from the user equipment, the second channel state information is calculated by assuming that the nodes included in the interference candidate modes among the cooperative transmission candidate nodes are interference nodes.

Also, the channel state information includes at least one of Channel Quality Indicator (CQI), Precoding Matrix Indicator (PMI), Rank Indicator (RI), and Concatenating PMI (CPMI).

Also, the second channel state information is calculated by excluding the nodes assumed as the interference nodes among the cooperative transmission candidate nodes.

Also, the cooperative transmission candidate nodes and the interference candidate nodes correspond to cooperative transmission candidate antenna ports and interference candidate antenna ports.

Advantageous Effects

According to the embodiment of the present invention, the method for transmitting and receiving channel state information efficiently for cooperative transmission or cooperative interference removal between nodes in a multi-node system (DAS) and the apparatus for the same may be provided to ensure efficient and optimized data transmission and reception.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

The following detailed description includes detailed matters to provide full understanding of the present invention. However, it will be apparent to those skilled in the art that the present invention can be carried out without the detailed matters. Also, technique, device and system, which will be described hereinafter, may be applied to various wireless access systems. Examples of the various wireless access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system. The CDMA system may be implemented by the radio technology such as universal terrestrial radio access (UTRA) or CDMA2000. The TDMA system may be implemented by the radio technology such as global system for mobile communications (GSM), general packet radio service (GPRS) and enhanced data rates for GSM evolution (EDGE). The OFDMA system may be implemented by the radio technology such as IEEE 802.11 (Wi-Fi), IEEE 802.16 (WiMAX), IEEE 802.20, and evolved UTRA (E-UTRA). The UTRA system is a part of a universal mobile telecommunications system (UMTS), and a 3rd generation partnership project long term evolution (3GPP LTE) communication system is a part of an evolved UMTS (E-UMTS) that uses E-UTRA. The 3GPP LTE communication system uses OFDMA in a downlink while uses SC-FDMA in an uplink. LTE-advanced (LTE-A) is an evolved version of the 3GPP LTE system. For example, although the following description will be made based on a wireless communication system corresponding to the 3GPP LTE/LTE-A system, the following description may be applied to other wireless communication systems except for unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the present invention, a user equipment may be fixed or may have mobility, and generically refers to a device for transmitting and receiving various data and control information by performing communicating with a Base Station (BS). The user equipment may be referred to as Mobile Station (MS), Mobile Terminal (MT), User Terminal (UT), Subscriber Station (SS), wireless device, Personal Digital Assistant (PDA), wireless modem, handheld device, etc.

Also, a base station generically refers to a fixed station which performs communication with a user equipment or another base station, and exchanges various data and control information with the user equipment or another base station. The base station may be referred to as evolved Node B (eNB), Base Transceiver System (BTS), Advanced Base Station (ABS), Processing Server (PS), Radio Remote Header (RRH), Access Point (AP), etc.

In the present invention, allocation of a specific signal to a frame/subframe/slot/carrier/subcarrier means transmitting the specific signal through a corresponding carrier/subcarrier during the duration of a corresponding frame/subframe/slot or at the timing of the corresponding frame/subframe/slot.

In the present invention, a rank or a transmission rank refers to the number of layers that are multiplexed or allocated to one Orthogonal Frequency Division Multiplexing (OFDM) symbol or one Resource Element (RE).

Figure 1:
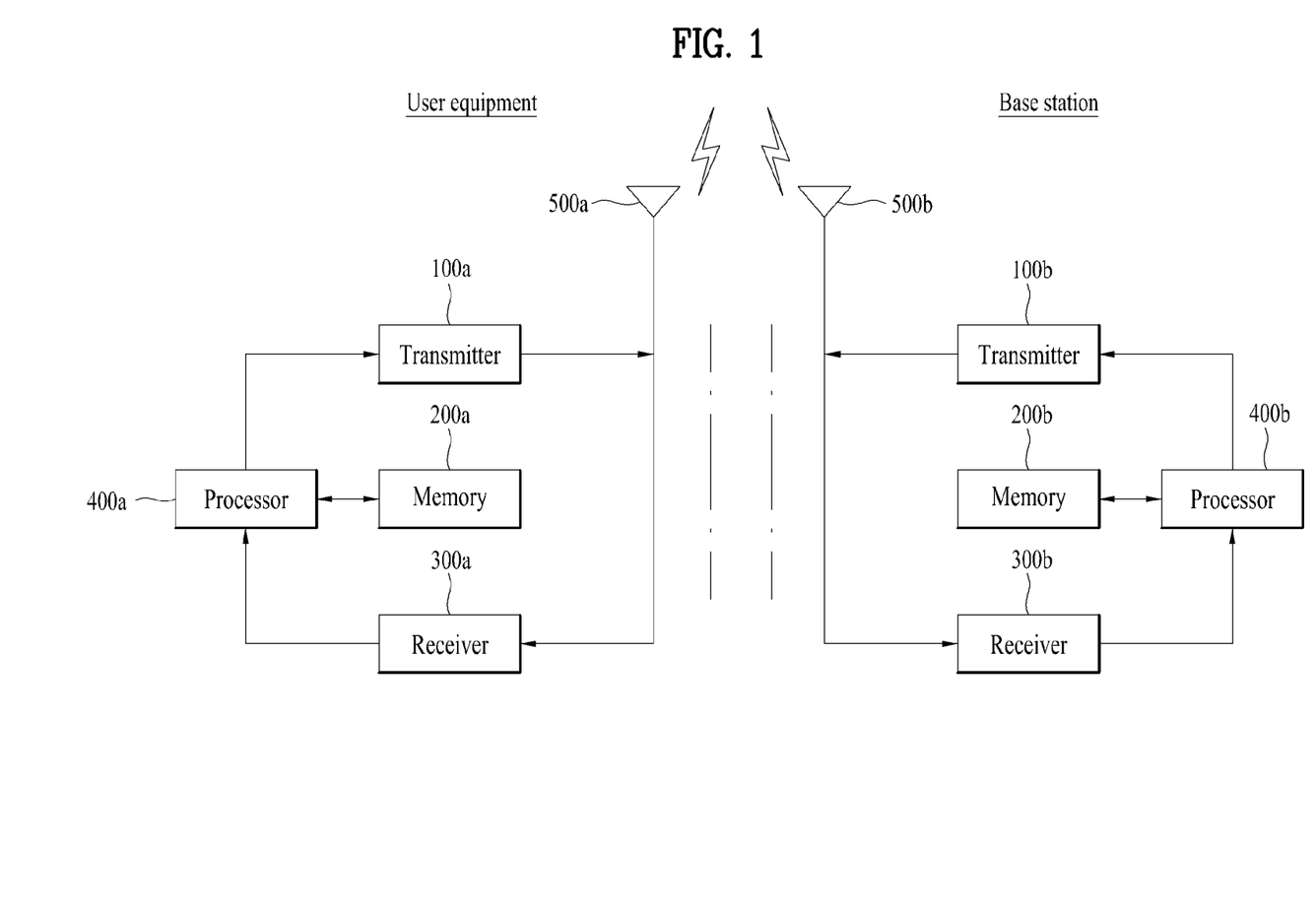
FIG. 1 is a brief diagram illustrating configurations of a user equipment and a base station to which the present invention is applied.

FIG. 1 is a brief diagram illustrating configurations of a user equipment and a base station to which the present invention is applied. The user equipment operates as a transmitting device on an uplink and as a receiving device on a downlink. On the contrary, the base station operates as a receiving device on the uplink and as a transmitting device on the downlink.

Referring to FIG. 1, each of the user equipment and the base station includes an antenna 500a or 500b for receiving information, data, signals, or messages, a transmitter 100a or 100b for transmitting information, data, signals, or messages by controlling the antenna 500a or 500b, a receiver 300a or 300b for receiving information, data, signals, or messages by controlling the antenna 500a or 500b, and a memory 200a or 200b for temporarily or permanently storing various types of information in a wireless communication system. Each of the user equipment and the base station further includes a processor 400a or 400b configured to control the transmitter, the receiver, and the memory.

The transmitter 100a, the receiver 300a, the memory 200a, and the processor 400a of the user equipment may be configured as independent components by separate chips or two or more thereof may be integrated into one chip. The transmitter 100b, the receiver 300b, the memory 200b, and the processor 400b of the base station may be configured as independent components by separate chips or two or more thereof may be integrated into one chip. The transmitter and the receiver may be integrated into a single transceiver in the user equipment or the base station.

The antenna 500a or 500b transmits signals generated from the transmitter 100a or 100b to the outside or receives signals from the outside and provides the received signals to the receiver 300a or 300b. The antenna 500a or 500b is also referred to as an antenna port, antenna group and virtual antenna. The antenna port may correspond to one physical or logical antenna or a combination of a plurality of physical or logical antennas. If a transmitter and a receiver support Multiple Input Multiple Output (MIMO) in which data are transmitted and received through a plurality of antennas, each of the transmitter and the receiver may be connected to two or more antennas.

The processor 400a or 400b generally controls overall operation of the components or modules of the user equipment or the base station. Especially, the processor 400a or 400b may perform various control functions for implementing the present invention, a Medium Access Control (MAC) frame conversion control function based on service characteristics and a propagation environment, a power saving mode function for controlling an idle-mode operation, a handover function, an authentication and encryption function, etc. The processor 400a or 400b may be called a controller, microcontroller, microprocessor, or microcomputer. Meanwhile, the processor 400a or 400b may be configured in hardware, firmware, software, or a combination of hardware, firmware, and software.

In the present invention based on a hardware configuration, the processor 400a or 400b may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. which are configured to implement the present invention.

In the present invention based on a firmware or software configuration, firmware or software may be configured so as to include a module, a procedure, a function, etc. that perform the functions or operations of the present invention. The firmware or software configured to implement the present invention may be included in the processor 400a or 400b, or may be stored in the memory 200a or 200b and driven by the processor 400a or 400b.

The transmitter 100a or 100b performs predetermined coding and modulation for signals or data which are scheduled by the processor 400a or 400b or a scheduler connected to the processor 400a or 400b and to be transmitted to the outside, and transmits the modulated signals or data to the antenna 500a or 500b. The transmitter 100a or 100b and the receiver 300a or 300b of the user equipment and the base station may be configured differently in accordance with operations of processing a transmission signal and a received signal.

The memory 200a or 200b may store programs for processing and controlling in the processor 400a or 400b and may temporarily store input and output information. Also, the memory 200a or 200b may be used as a buffer. The memory 200a or 200b may be configured using a flash memory type, a hard disk type, a multimedia card micro type, a card type memory (e.g. a Secure Digital (SD) or extreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disc, etc.

Also, the user equipment and the base station may perform a method of various embodiments, which will be described hereinafter, in accordance with the aforementioned structure.

Figure 2:
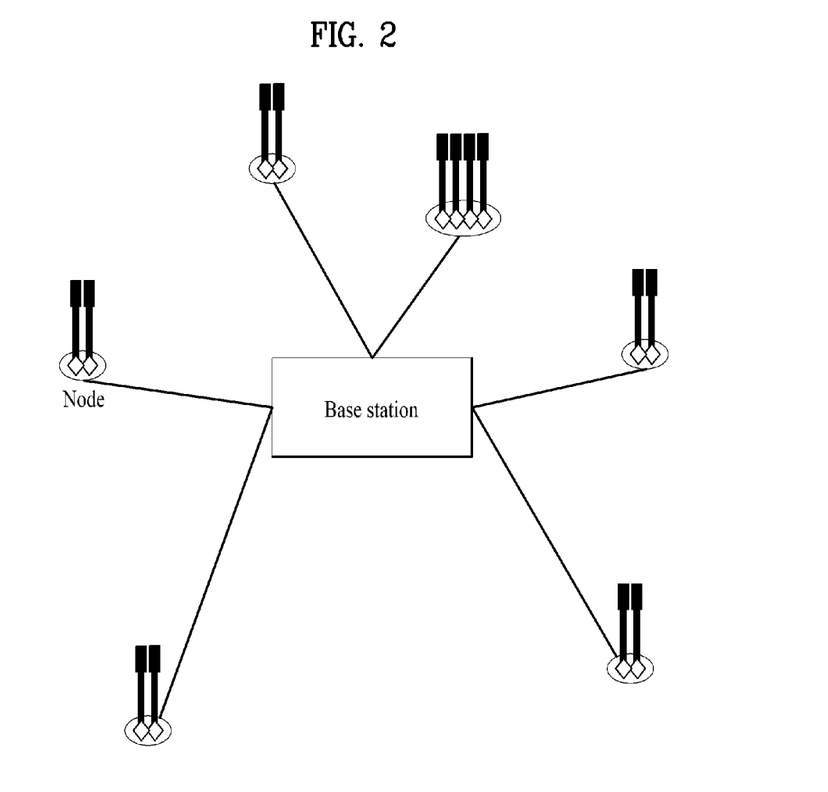
FIG. 2 is a diagram illustrating an example of a multi-node system (DAS) to which the present invention is applied.

FIG. 2 is a diagram illustrating an example of a multi-node system (DAS) to which the present invention is applied. In more detail, FIG. 2 illustrates a distributed multi-node system (DMNS) of the DAS.

Referring to FIG. 2, in the DMNS, a plurality of nodes spaced apart from one another in a certain local area are connected to one base station or base station controller through a cable or dedicated line. In other words, one controller controls transmission and reception through all the nodes located within the certain local area.

In the meantime, although FIG. 2 illustrates that one controller controls transmission and reception through all the nodes located within the certain local area, it is not required that nodes, which perform cooperative transmission, should be controlled by only one controller. The present invention may be applied to the case where nodes controlled by different base stations or base station controllers perform cooperative transmission. In other words, in the multi-node system according to the present invention, one or more base stations or base station controllers, which are connected to the plurality of nodes, may control the plurality of nodes to transmit or receive signals to or from the user equipment through some of the plurality of nodes at the same time.

Although there is a difference between the multi-node systems in accordance with entity and embodiment of each node, the multi-node systems are different from a single node system (for example, CAS, MIMO system of the related art, relay system of the related art, and repeater system of the related art) in that the plurality of nodes provide communication services to the user equipment on a predetermined time-frequency resource. Accordingly, the embodiments of the present invention in respect of a method for performing cooperative transmission using all or some of a plurality of nodes may be applied to various multi-node systems. For example, although the nodes refer to an antenna group spaced apart from another node, the embodiments of the present invention, which will be described later, may be applied to the case where the nodes mean a random antenna group regardless of spacing. The antenna group may be replaced with an antenna port, antenna pattern and antenna configuration.

Figure 3:
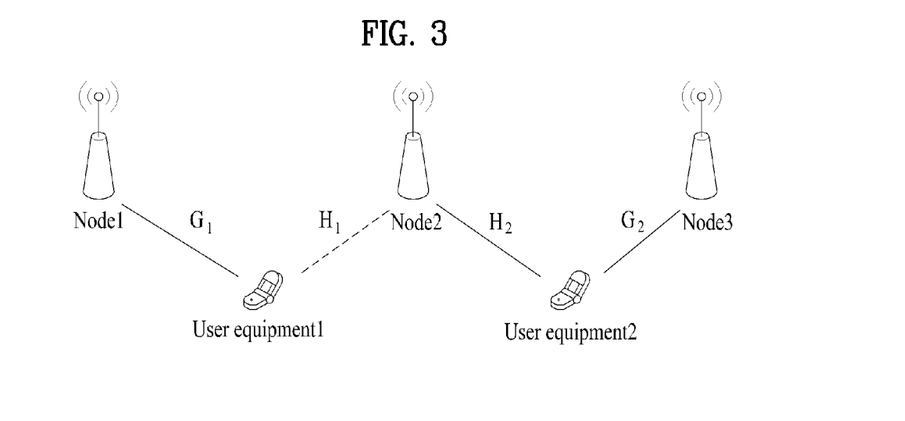
FIG. 3 is a diagram illustrating an example of cooperative transmission between nodes to which the present invention is applied.

FIG. 3 is a diagram illustrating an example of cooperative transmission between nodes to which the present invention is applied. The multi-node system (DAS) may have more excellent throughput than non-cooperative transmission in accordance with efficient interference avoidance or removal scheme in such a manner that multiple nodes transmit and receive data to common user equipment(s) in cooperation with one another at the same time or share information of a node that provides more interference.

For efficient cooperative transmission between the nodes, feedback information of the user equipment, that is, channel state information transmitted from the user equipment, may be used. This feedback information may be divided into two types in accordance with methods of cooperative transmission between the nodes. Hereinafter, the feedback information of the user equipment according to the methods of cooperative transmission between the nodes will be described in detail.

First of all, joint processing or multi-BS joint processing scheme is defined as a transmission scheme for transmitting data from a plurality of nodes to a user equipment in one resource region. Hereinafter, in the embodiment of the present invention, for convenience of description, joint processing or multi-BS joint processing will be referred to as JP. When performing JP, the user equipment obtains a channel value of each node and feeds channel state information back on the basis of the channel value. The channel state information may include Channel Quality Indicator (CQI), Precoding Matrix Indicator (PMI), Rank Indicator (RI), etc. The CQI represents a signal to interference-noise ratio, and may be expressed as a power level or modulation and coding (MCS) level. The PMI indicates a vector which is an element of a codebook of the user equipment, or index of matrixes.

Referring to FIG. 3, supposing that a node 1 and a node 2 are cooperative transmission candidate nodes, the user equipment 1 may acquire channel values G1 and H1 by measuring channels of the node 1 and the node 2. The user equipment may obtain a precoding vector or precoding matrix having maximum received signal strength on the basis of the channel values G1 and H1.

For example, the user equipment 1 obtains the value of V1 having maximum $\|G1V1\|$, and obtains of a value of W1 having maximum $\|H1W1\|$. Also, the user equipment may obtain a value of $e^{j\theta}$ or $\theta$ having maximum $\|G1V1+H1W1e^{j\theta}\|$. At this time, the value of $e^{j\theta}$ or $\theta$ may be referred to as Concatenating PMI (CPMI). The precoding vector (for example, V1 and W1) is quantized to a value of 3 bits to 6 bits, and is expressed as PMI. Meanwhile, there is difficulty in representing a phase difference between the nodes by using PMI only due to limitation of quantization. In this respect, in the IEEE 802.16m system which is an example of the wireless communication system, a phase may be represented by $e^{j\theta}$, its $\theta$ value may be defined previously, and index thereof may be fed back as CPMI. In other words, for cooperative transmission between the nodes, PMI and CPMI of the respective cooperative transmission candidate nodes may be transmitted. In addition, it will be apparent that CQI and RI may be transmitted together with PMI and CPMI.

In the meantime, in the IEEE 802.16m system, the user equipment calculates PMI and CPMI of each node that performs JP, and feeds back the calculated PMI and CPMI, and may feed back one CQI for reference when the cooperative transmission candidate nodes perform JP. At this time, since Rank is assumed as 1 and then calculated, the user equipment may not transmit rank indicator (RI).

Second, as a transmission scheme for avoiding interference by sharing information of node (or cell), which causes interference, Coordinated Scheduling, Coordinated Beamforming or Single-BS Precoding with Multi-BS Coordination is defined. Hereinafter, in the present invention, for convenience of description, Coordinated Scheduling, Coordinated Beamforming or Single-BS Precoding with Multi-BS Coordination will be referred to as CS. According to the CS, if the user equipment measures a channel of an interference node, calculates PMI having the greatest interference or the smallest interference, and transfers the calculated PMI to a serving node, the serving node notifies the interference node of the calculated PMI, whereby the interference node may be restricted to use the PMI having the greater interference or may be led to use the PMI having the smaller interference. Although the PMI has been described as an example, it will be apparent that the CS may equally be applied to all kinds of the channel state information.

In the meantime, as described above, the channel state information is fed back from the user equipment to the network formed for cooperative transmission by the nodes. However, a specific node may not transmit and receive data on the basis of the channel state information fed back from the user equipment. For example, although JP is fed back to the specific node, the specific node may perform single transmission to a single node without performing JP as a result of scheduling. Also, although feedback is performed by assuming that N number of nodes perform cooperative transmission, cooperative transmission may be performed by the nodes less than N. The nodes which do not perform JP may transmit data to another user equipment by using the same resource at the same time. In this case, the signal may act as interference to the user equipment.

Accordingly, the embodiment of the present invention suggests that the user equipment feeds back a plurality of kinds of channel state information to the network, that is, each node, for flexible scheduling of the network. Hereinafter, for convenience of description, although the present invention will be described on the basis of the PMI of the channel state information, the present invention is not limited to the PMI and may similarly be applied to various kinds of channel state information.

Referring to FIG. 3, cooperative transmission candidate nodes of the user equipment 1 are the node 1 and the node 2, and cooperative transmission candidate nodes of the user equipment 2 are the node 2 and the node 3. The user equipment 1 and the user equipment 2 feed PMI and CPMI of the respective candidate nodes and other required information back by assuming JP. However, as shown in FIG. 3, if the node 2 transmits data to the user equipment 1, it acts as interference to the user equipment 2. In this case, although the network may perform a control operation so as not to transmit data to the user equipment 2, if the network intends to increase system throughput by scheduling the user equipment 1 and the user equipment 2 at the same time, the network may perform a control operation so that only the node 3 transmits data to the user equipment 2. However, since the PMI and CPMI fed back to the node 3 are calculated by the user equipment 2 by assuming JP of the node 2 and the node 3, the node 3 cannot provide optimized throughput to the user equipment 2 when transmitting data to the user equipment 2. Accordingly, the user equipment 2 is required to provide additional PMI in addition to the PMI and/or CPMI for the node 3, which is obtained by assuming JP of the node 2 and the node 3.

Figure 4:
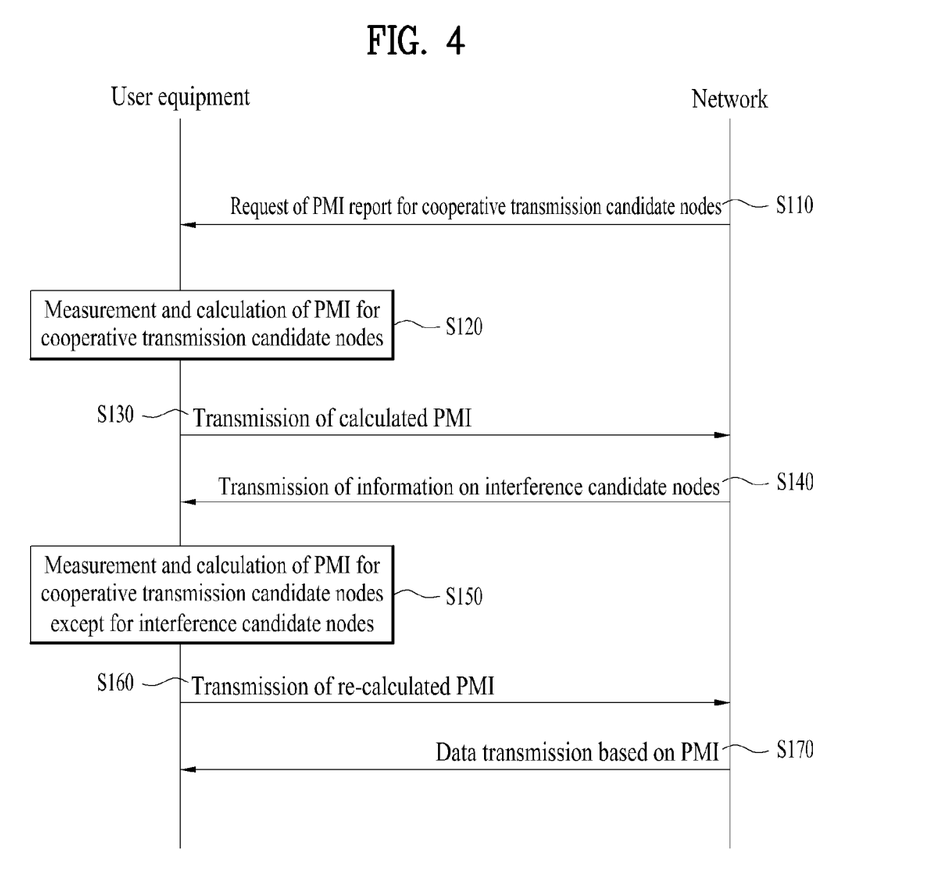
FIG. 4 is a diagram illustrating a procedure of transmitting channel state information in accordance with the first embodiment of the present invention.

FIG. 4 is a diagram illustrating a procedure of transmitting channel state information in accordance with the first embodiment of the present invention. In more detail, FIG. 4 illustrates a procedure of transmitting PMI. In this embodiment, some of cooperative transmission candidate nodes for a specific user equipment cannot perform JP. If some of the cooperative transmission candidate nodes cannot perform JP, as shown in FIG. 3, the corresponding node may act as an interference node for the user equipment as described above.

The network formed by the nodes requests the user equipment to report PMI for the cooperative transmission candidate nodes (S110). The user equipment calculates PMI for each cooperative transmission candidate node (S120), and transmits the calculated PMI to the network (S130). At this time, if some of the cooperative transmission candidate nodes perform JP, the network transmits information of the corresponding node, that is, the node, which acts as the interference node to the user equipment, and PMI of the corresponding node to the user equipment (S140). The user equipment may again calculate PMI of the cooperative transmission candidate nodes except for the node, which acts as the interference node, on the basis of the information received from the network (S150), and may transmit the calculated PMI to the network (S160). For example, in FIG. 3, if the node 2 uses a precoder of V2 and the network notifies the user equipment 1 that the node 2 will acts as the interference node, since the user equipment 1 knows H1, G1 and V2, the user equipment 1 may calculate WP which is new PMI satisfying $H1W1' \perp G1V2$ and/or max $\|H1W1'\|^2$ or obtain W1' within a codebook and then transmit the calculated or obtained W1. The cooperative transmission candidate nodes may transmit data to the user equipment by using each PMI which is received (S170).

Figure 5:
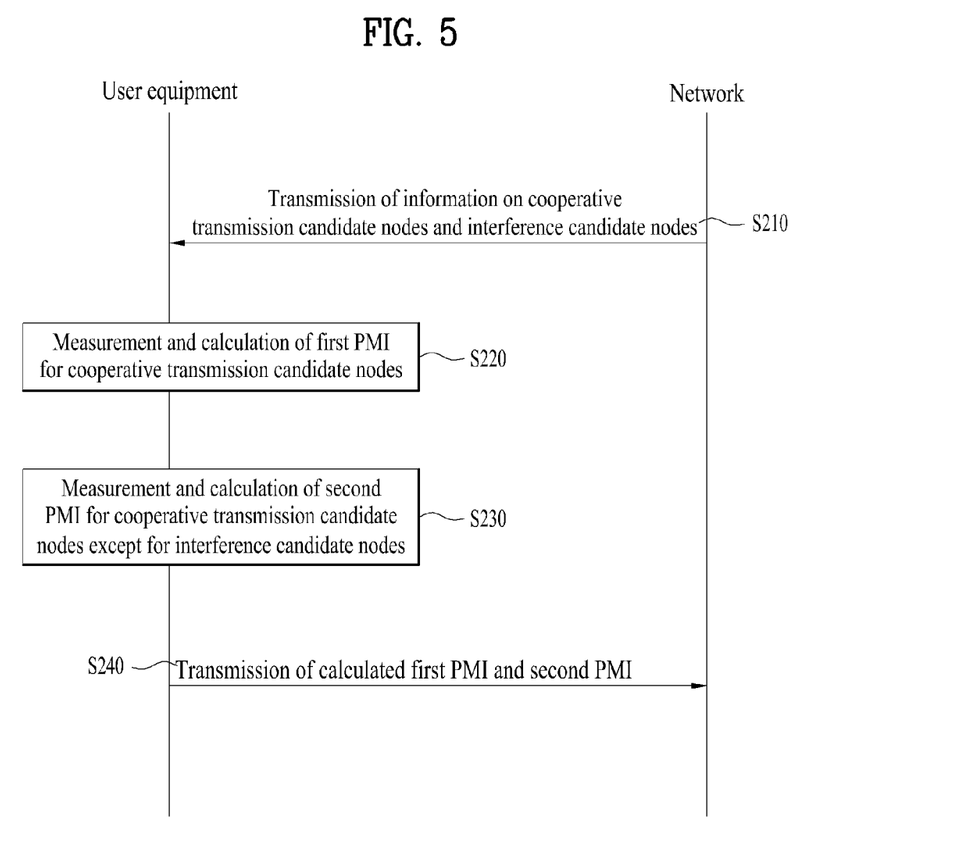
FIG. 5 is a diagram illustrating a procedure of transmitting channel state information in accordance with the second embodiment of the present invention.

FIG. 5 is a diagram illustrating a procedure of transmitting channel state information in accordance with the second embodiment of the present invention. Referring to FIG. 5, the network may transmit information on cooperative transmission candidate nodes and interference candidate nodes to the user equipment (S210). At this time, the information on the interference candidate nodes includes information as to which node of the cooperative transmission candidate nodes acts as the interference node and PMI used by the corresponding interference node. For example, in FIG. 3, the user equipment 1 is notified from the network that the node 1 and the node 2 are the cooperative transmission candidate nodes and the node 2 is the interference node. The interference candidate node may be selected from the cooperative transmission candidate nodes. The network may first notify a set of the cooperative transmission candidate nodes, and may transmit the interference candidate node of the cooperative transmission candidate nodes by using a bitmap, etc. Since the interference candidate node may be the cooperative transmission candidate node for another user equipment, it may be referred to as a shared node.

If the user equipment receives the information on the cooperative transmission candidate nodes and the interference candidate node from the network, the user equipment may calculate the first PMI and/or the first CPMI for each of the cooperative transmission candidate nodes by assuming JP of the cooperative transmission candidate nodes, on the basis of the received information (S220), regard the interference candidate node as the interference node, and calculate the second PMI and/or the second CPMI for each of the cooperative transmission candidate nodes except for the interference node (S230). For example, in FIG. 3, since the user equipment 1 knows H1 and G1, the user equipment 1 may calculate W1' which is PMI satisfying $H1W1' \perp G1(:, k1, k2, \ldots, kn)$ and/or max $\|H1W1'\|^2$ or obtain W1' within a codebook. $G1(:, k1, k2, \ldots, kn)$ is the matrix configured by k1, k2, ..., knth columns of G1. Preferably, the column having great norm is used when a part of the columns of G1 is used. Each column represents each layer of rank n (n is a natural number). In other words, using a part of the columns means using a part of layers of rank. At this time, the part of the layers means the layer having the best throughput of columns of great norm, that is, $H1W1' \perp G1(:k1)$, $H1W1' \perp G1(:k2)$, ..., $H1W1' \perp G1(:kn)$.

The user equipment 1 may calculate PMI1, PMI2, and CPMI by assuming JP for the node 1 and the node 2, which are the cooperative transmission candidate nodes, and may additionally calculate PMI1' by regarding the node 2, which is the interference candidate node, as the interference node. Afterwards, the user equipment may transmit the calculated first PMI and/or first CPMI and the second PMI and/or second CPMI to the network.

Alternatively, the user equipment, which has received the information as to that the node 1 of the cooperative transmission candidate nodes node 1, node 2 and node 3 is the interference candidate node, calculates PMI and/or CPMI by assuming that the node 1, the node 2 and the node 3 perform JP, and feeds the calculated PMI and/or CPMI back to each node (for example, PMI1, PMI2, PMI3, CPMI2, CPMI3). Also, the user equipment may calculate PMI and/or CPMI by assuming that the node 1 acts as the interference node and the node 2 and the node 3 perform JP, and may additionally transmit the calculated PMI and/or CPMI to each node (for example, PMI2', PMI3', CPMI2', CPMI3').

In the meantime, if the network formed by the nodes notifies the user equipment of the plurality of interference candidate nodes, the network may additionally notify the user equipment of layer relation between the interference candidate nodes. For example, in addition to the information as to that the node 1 and the node 2 are the interference candidate nodes, the network may additionally notify that the node 1 and the node 2 form one layer (or stream) or each of the node 1 and the node 2 forms one layer.

Although the aforementioned embodiments have been described on the basis of PMI as the channel state information, in the following embodiments, the channel information will be described on the basis of CQI. However, the present invention is not limited to the following embodiment.

If there is the interference candidate node of the cooperative transmission candidate nodes, the user equipment calculates CQI by regarding the interference candidate node as the interference node. For example, if the user equipment 1 receives information as to that the node 1 and the node 2 are the cooperative transmission candidate nodes and the node 1 is the interference node, from the network, the user equipment calculates the first CQI by assuming that the node 1 and the node 2 perform JP, and additionally calculates the second CQI by assuming that the node 1 acts as the interference node and receives data from the node. The user equipment may calculate the second CQI by assuming that the node 2 and the node 1 will transmit data to their respective user equipments different from each other and a demodulation reference signal (RS) for each of the data will exist. For example, in FIG. 3, if the user equipment obtains the second CQI by assuming that the node 3 transmits data to the user equipment 2 and the node 2 acts as the interference node, the user equipment may calculate the second CQI by assuming $$r = [\,H2W \quad G2V\,]\begin{bmatrix} X \\ S \end{bmatrix} + n.$$

At this time, r represents the received signal, W represents the precoder for the node 2, V represents the precoder for the node 3, X represents an interference signal occurring in the node 2, S represents data transmitted from the node 3, and n represents other interference and noise. The user equipment may receive W from the network, or may assume a random precoder. Preferably, the random precoder may correspond to a random precoding vector or matrix within the codebook stored in the user equipment. Also, H2W may correspond to the column having the greatest norm among the columns of H2.

Figure 6:
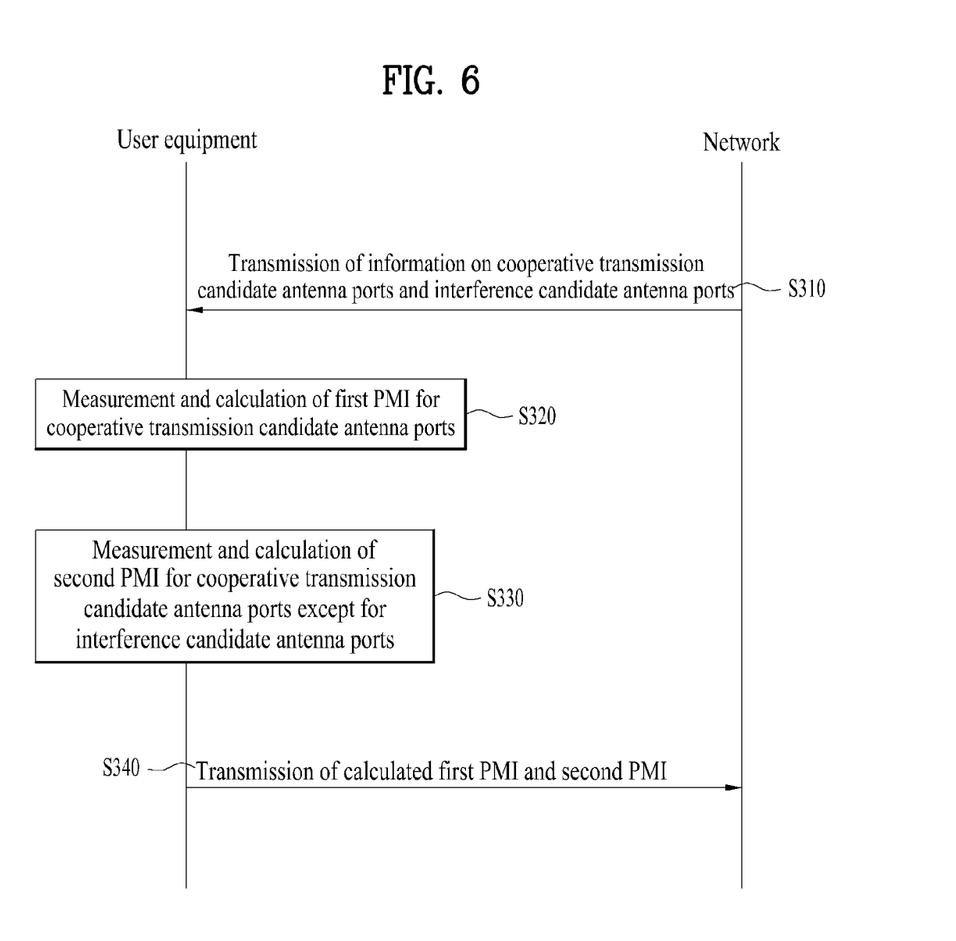
FIG. 6 is a diagram illustrating a procedure of transmitting channel state information in accordance with the third embodiment of the present invention.

FIG. 6 is a diagram illustrating a procedure of transmitting channel state information in accordance with the third embodiment of the present invention. In more detail, FIG. 6 illustrates the procedure of transmitting PMI. IN this embodiment, PMI for all the antenna ports may be defined. Referring to FIG. 6, assuming that two antenna ports exist per node, in order that antenna ports of the node 1 and the node 2 are used as cooperative transmission antenna ports of the user equipment 1, the network may transmit information indicating that four antenna ports correspond to cooperative transmission candidate antenna ports, to the user equipment (S310). This information may be transmitted through a reference signal. Preferably, the network may notify the user equipment of the information through a channel state information reference signal (CSI-RS) corresponding to four antenna ports. Also, the network may additionally notify the user equipment of interference candidate antenna ports, which may act interference antennas, among four cooperative transmission candidate antenna ports (S310). For example, the network may notify the user equipment that antenna port k1 and antenna port k2 of the four antenna ports correspond to the interference candidate antenna ports, which may provide interference signals.

Based on the received information, the user equipment may obtain or calculate the first PMI from 4Tx codebook by assuming that four antenna ports are the cooperative transmission antenna ports (S320), and may assume that the antenna ports k1 and k2 of the four antenna ports are interference antenna ports and obtain or calculate the second PMI from 2Tx codebook with respect to the other antenna ports except for the interference antenna ports (S330). The user equipment may feed the calculated first PMI and second PMI back to the network (S340).

Alternatively, the user equipment may command the user equipment to calculate the first PMI for four antenna ports and the second PMI assuming cooperative transmission of the antenna ports k3 and k4 and feed the calculated first PMI and second PMI back. The user equipment may obtain the first PMI from the 4Tx codebook with respect to four antenna ports and obtain the second PMI from the 2Tx codebook with respect to the antenna ports k3 and k4. The antenna port may be replaced with the terms such as antenna, CSI-RS port, antenna configuration, and antenna pattern, as mentioned above.

In the meantime, in the embodiment of the present invention, the operation of the user equipment, which calculates PMI, may be replaced with the operation for calculating the precoding vector/matrix, and the operation of the user equipment, which obtains CPMI, may be replaced with the operation for calculating a phase control value.

Also, the channel state information for the specific node may be measured using a reference signal (RS) transmitted from the specific node to all bands. For example, a cell specific reference signal and a channel state information reference signal (CSI-RS) may be used for calculation of the channel state information. The reference signal may be referred to as other terms such as pilot, preamble, and midamble. Signals used by the user equipment to estimate and measure the channel state may be the reference signals applied to the present invention regardless of their title. In order that neighboring nodes of the multi-node system transmit reference signals for channel measurement on different time-frequency resources, groups of time-frequency resources, which may transmit the reference signals within the resource region defined by a plurality of time-frequency resources, may be defined previously.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. It will be apparent that some claims referring to specific claims may be combined with another claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The method for transmitting and receiving channel state information according to the present invention may industrially be applicable to various wireless communication systems such as 3GPP LTE system, 3GPP LTE-A system and IEEE 802 system.

The invention claimed is:

1. A method for transmitting channel state information by a user equipment in a multi-node system, the method comprising:

receiving information on cooperative transmission candidate nodes and interference candidate nodes from a network;

calculating first channel state information and second channel state information by excluding nodes assumed as interference nodes;

transmitting the calculated first channel state information and the second channel state information to the network, wherein the first channel state information on the cooperative transmission candidate nodes is calculated by assuming that the interference nodes comprise nodes included only in the interference candidate nodes and not included in the cooperative transmission candidate nodes, and wherein the second channel state information on the cooperative transmission candidate nodes is calculated by assuming that the interference nodes comprise nodes included in the interference candidate nodes among the cooperative transmission candidate nodes; and wherein the cooperative transmission candidate nodes and the interference candidate nodes correspond to cooperative transmission candidate antenna ports and interference candidate antenna ports, respectively.

2. The method according to claim 1, wherein at least one of the first channel state information and the second channel state information includes at least one of Channel Quality Indicator (CQI), Precoding Matrix Indicator (PMI), Rank Indicator (RI), and Concatenating PMI (CPMI).

3. A method for receiving channel state information at a network in a multi-node system, the method comprising:

transmitting information on cooperative transmission candidate nodes and interference candidate nodes to a user equipment; and receiving first channel state information and second channel state information, which are calculated by excluding nodes assumed as interference nodes, wherein the first channel state information on the cooperative transmission candidate nodes is calculated by assuming that the interference nodes comprise nodes included only in the interference candidate nodes and not included in the cooperative transmission candidate nodes, and wherein the second channel state information on the cooperative transmission candidate nodes is calculated by assuming that the interference nodes comprise nodes included in the interference candidate nodes among the cooperative transmission candidate nodes;

wherein the cooperative transmission candidate nodes and the interference candidate nodes correspond to cooperative transmission candidate antenna ports and interference candidate antenna ports, respectively.

4. The method according to claim 3, wherein at least one of the first channel state information and the second channel state information includes at least one of Channel Quality Indicator (CQI), Precoding Matrix Indicator (PMI), Rank Indicator (RI), and Concatenating PMI (CPMI).

5. An apparatus for transmitting channel state information in a multi-node system, the apparatus comprising:

a transmitter;

a receiver;

and a processor, wherein the processor controls the receiver to receive information on cooperative transmission candidate nodes and interference candidate nodes from a network, calculates first channel state information and second channel state information by excluding nodes assumed as interference nodes and controls the transmitter to transmit the calculated first channel state information and the calculated second channel state information to the network, wherein the first channel state information on the cooperative transmission candidate nodes is calculated by assuming that the interference nodes comprise nodes included only in the interference candidate nodes and not included in the cooperative transmission candidate nodes, and wherein the second channel state information on the cooperative transmission candidate nodes is calculated by assuming that the interference nodes comprise nodes included in the interference candidate nodes among the cooperative transmission candidate nodes;

wherein the cooperative transmission candidate nodes and the interference candidate nodes correspond to cooperative transmission candidate antenna ports and interference candidate antenna ports, respectively.

6. The apparatus according to claim 5, wherein at least one of the first channel state information and the second channel state information includes at least one of Channel Quality Indicator (CQI), Precoding Matrix Indicator (PMI), Rank Indicator (RI), and Concatenating PMI (CPMI).

7. An apparatus for receiving channel state information in a multi-node system, the apparatus comprising:

a transmitter;

a receiver; and a processor, wherein the processor controls the transmitter to transmit information on cooperative transmission candidate nodes and interference candidate nodes to a user equipment, and controls the receiver to receive first channel state information and second channel state information, which are calculated by excluding nodes assumed as interference nodes, first wherein the first channel state information on the cooperative transmission candidate nodes is calculated by assuming that the interference nodes comprise nodes included only in the interference candidate nodes and not included in the cooperative transmission candidate nodes, and wherein the second channel state information on the cooperative transmission candidate nodes is calculated by assuming that the interference nodes comprise nodes included in the interference candidate nodes among the cooperative transmission candidate nodes;

wherein the cooperative transmission candidate nodes and the interference candidate nodes correspond to cooperative transmission candidate antenna ports and interference candidate antenna ports, respectively.

8. The apparatus according to claim 7, wherein at least one of the first channel state information and the second channel state information includes at least one of Channel Quality Indicator (CQI), Precoding Matrix Indicator (PMI), Rank Indicator (RI), and Concatenating PMI (CPMI).

* * * * *